United States Patent [19]

Moris

[11] 4,393,423
[45] Jul. 12, 1983

[54] ENDLESS LOOP TAPE MAGAZINE, AND A RECORDING AND/OR PLAYBACK MACHINE UTILIZING THE MAGAZINE

[75] Inventor: Alfred H. Moris, St. Paul, Minn.

[73] Assignee: Minnesota Mining and Manufacturing Company, St. Paul, Minn.

[21] Appl. No.: 262,311

[22] Filed: May 11, 1981

Related U.S. Application Data

[60] Division of Ser. No. 27,312, Apr. 5, 1979, Pat. No. 4,293,882, which is a continuation of Ser. No. 820,250, Jul. 29, 1977, abandoned.

[51] Int. Cl.³ .............................................. G11B 15/00
[52] U.S. Cl. ................................ 360/93; 242/55.19 A
[58] Field of Search ........................... 360/93, 90, 132; 242/55.19 A, 71.8

[56] References Cited

U.S. PATENT DOCUMENTS

| | | | |
|---|---|---|---|
| 2,327,108 | 8/1943 | Heyer | 242/55.19 A |
| 2,881,894 | 4/1959 | Regentrop et al. | 242/71.8 X |
| 2,918,536 | 12/1959 | Appert et al. | 360/93 |
| 3,287,508 | 11/1966 | Morrison | 360/93 |
| 3,304,019 | 2/1967 | Myers | 242/55.19 A |
| 3,311,315 | 3/1967 | Stark | 360/93 X |
| 4,054,925 | 10/1977 | Towner et al. | 360/90 X |

FOREIGN PATENT DOCUMENTS

| | | | |
|---|---|---|---|
| 174484 | 4/1953 | Austria | 360/93 |
| 518627 | of 1940 | United Kingdom . | |
| 971624 | 9/1964 | United Kingdom . | |
| 1216058 | 12/1970 | United Kingdom . | |
| 1389476 | 4/1975 | United Kingdom . | |

*Primary Examiner*—John H. Wolff
*Attorney, Agent, or Firm*—Cruzan Alexander; Donald M. Sell; William L. Huebsch

[57] ABSTRACT

A magazine including a fixed hub having a central opening and an endless loop of tape. The tape is wrapped about the hub to form a coil and extends from the innermost wrap in the coil through a slot in the hub, across the central opening and then around one side surface of the coil to the outermost wrap of the coil. A tape drive mechanism, tape guides and a transducer of a recording and/or playback machine can be positioned in the central opening to pull tape through the slot from the inner wrap of the coil and accurately guide the tape along a path past the transducer.

2 Claims, 7 Drawing Figures

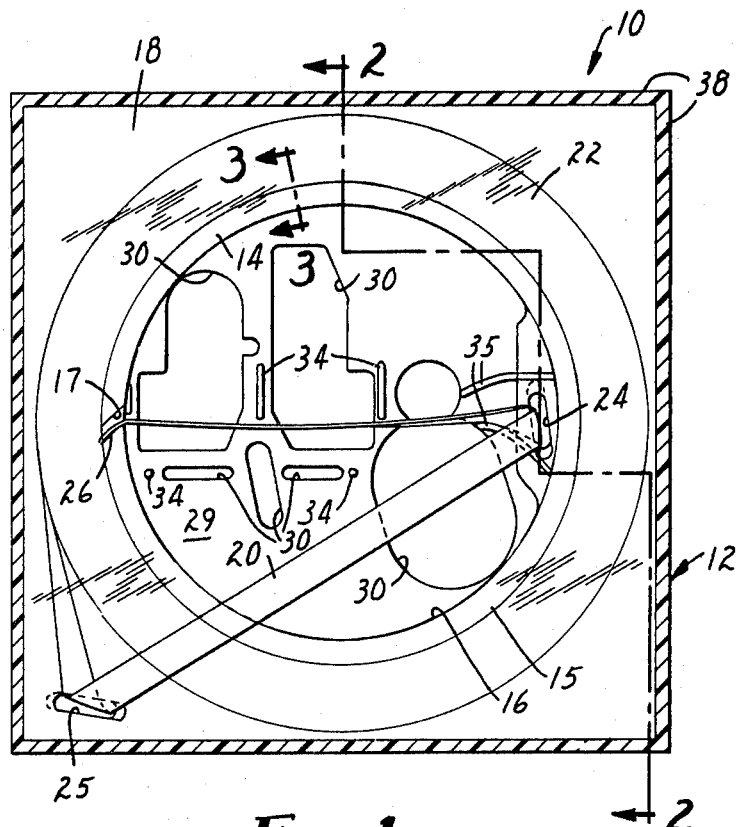
FIG. 1
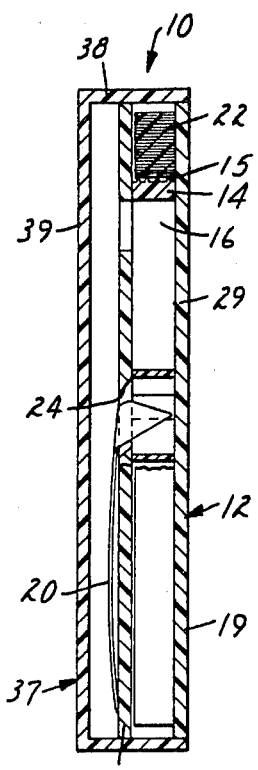
FIG. 2
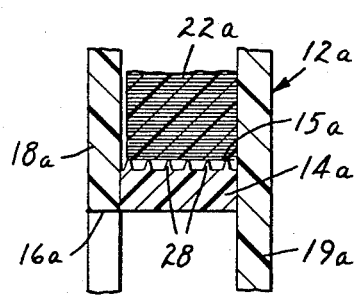
FIG. 4
FIG. 3

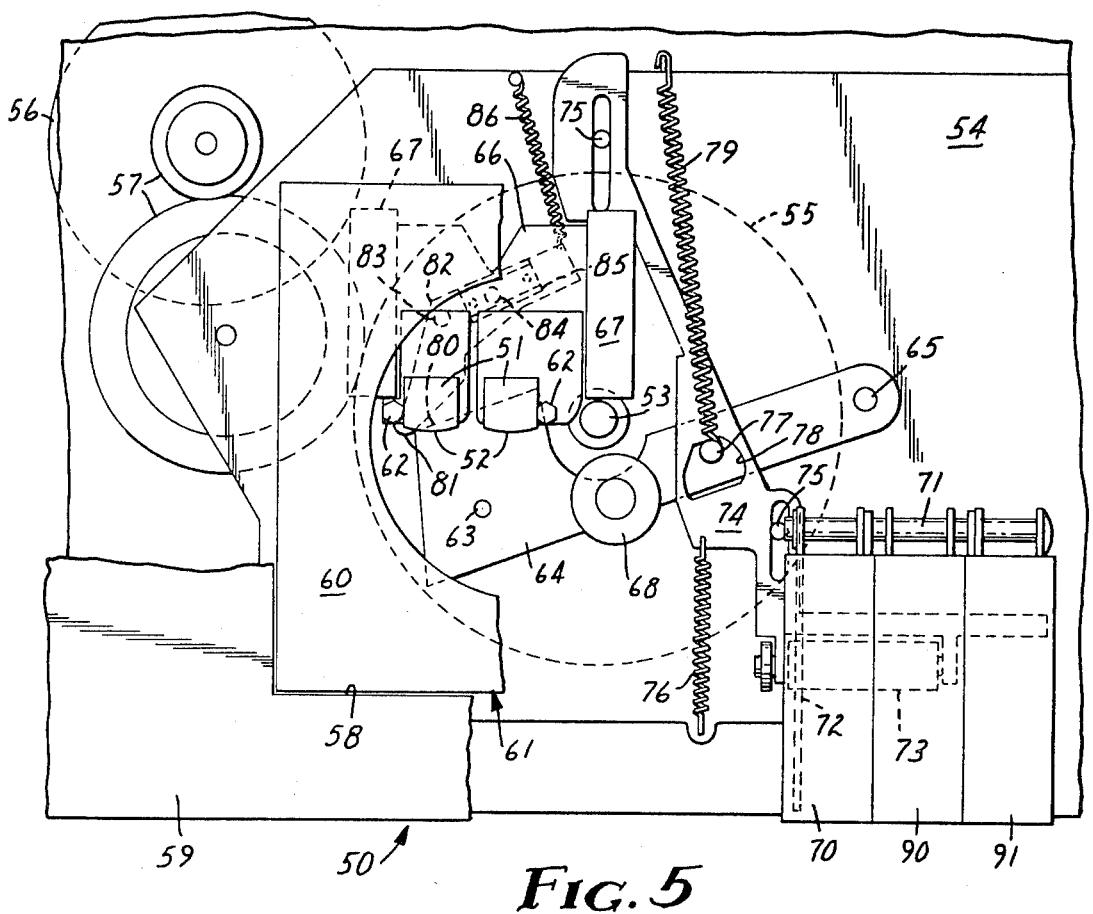
FIG. 5
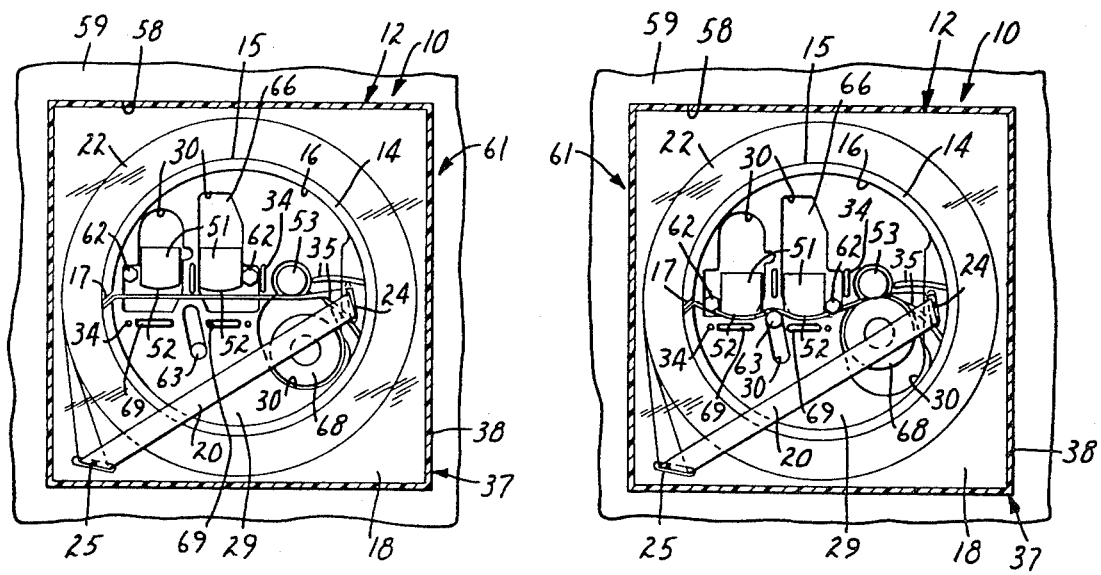
FIG. 6
FIG. 7

ENDLESS LOOP TAPE MAGAZINE, AND A RECORDING AND/OR PLAYBACK MACHINE UTILIZING THE MAGAZINE

This is a division of application Ser. No. 27,312, filed Apr. 5, 1979, now U.S. Pat. No. 4,293,882, which is a continuation of application Ser. No. 820,250, filed July 29, 1977, now abandoned.

BACKGROUND OF THE INVENTION

The present invention relates to magazines including an endless length of strip material, machines including a transducer for recording and/or reading signals on the strip material in the cartridge, and the method used by the combination for moving the strip material past the transducer; and in one important aspect to such a magazine containing magnetic tape and used in a magnetic recording and/or playback machine.

Magazines are known which include an endless loop of strip material or tape and means for supporting the tape for travel along a path past access areas defined in the magazine at which the tape may be engaged by means in a machine to drive it along the path past a transducer for recording and/or reading signals.

Such a magazine for an endless length of magnetic recording tape is described in U.S. Pat. No. 3,350,025. Magazines or cartridges generally of the type described in that patent include a hub about which the tape is wrapped to form a coil, and guides for guiding the tape from the innermost wrap of the coil, around one edge surface of the coil, past tape access areas defined on the cartridge, and then to the outermost wrap of the coil. A drive mechanism in a recording and/or playback machine can engage the tape at the tape access areas to pull it from the innermost wrap of the coil past transducers or record and playback heads in the machine. The guides in this type of cartridge provide most of the guiding for movement of the tape past the heads on the machine in which the cartridge is mounted, however. Thus the tape will be driven along a slightly inaccurate path past the head resulting in a significant phase error in the signal produced by the machine if only slight misalignment occurs between the transducers in the machine and guides for the tape in the cartridge mounted in the machine. Such misalignment can occur by inadvertently tilting the cartridge slightly when it is engaged with the machine, or will even occur because of dimensional variations in the housing portions of various cartridges which affect the position at which those cartridges are engaged by the machine.

Thus, while cartridges generally of this type have found some use in broadcast studios for prerecorded voice messages (such as commercials) where such signal errors are not easily detectable, they have not been widely used for reproducing music. Instead, broadcast studios have continued to use reel to reel recorders, which, despite their relative inconvenience, are far less subject to such signal errors.

Also, in a cartridge of the type described in U.S. Pat. No. 3,350,025 the tape is twisted and guided around the side surface of the coil while it is under tension from the tape drive means in a machine in which the magazine is mounted. This tends to wear the tape at a rapid rate, thereby reducing the useful life of the tape in the cartridge.

SUMMARY OF THE INVENTION

The present invention provides a method for driving an endless length of strip material past a transducer which will produce (if used in a magnetic recording and/or playback system) a fidelity comparable to that produced by professional reel to reel magnetic tape recorders, even if the strip material is contained in a magazine which is not precisely aligned in a machine which drives the tape past the transducer. Also the method causes significantly less wear on the tape in the magazine than is caused on the tape in the prior art cartridge described above.

According to the present invention, an endless length or loop of tape has a major portion wrapped in a coil about a fixed hub having a central opening and a minor portion of the tape extending from the innermost wrap of the coil through a slot in the hub, partially across a transducer positioned in the opening, and then around a side surface of the coil to its outermost wrap. Tape is pulled through the slot from the innermost wrap of the coil with the edges of the tape generally coplanar with the edges of the innermost wrap and is guided across the transducer by guides precisely oriented with respect to the transducer to reduce phase error. Then the tape is twisted and returned to the outermost wrap of the coil around the side surface of the coil when the tape is no longer under tension so that such twisting will cause little wear on the tape.

The coil will shift axially to provide the best possible alignment between its innermost wrap and the guides. Preferably the hub is part of the magazine releasably engageable with a machine on which the transducer is mounted and such shifting can correct for significant magazine irregularities or misalignments of the magazine in the machine without introducing a phase error in the signal produced. Preferably the magazine includes opposed flanges extending radially outwardly from the edges of the hub and between which the coil is wound. The spacing between these flanges should exceed the tape width by at least 0.025 inch and preferably by about 0.03 inch to allow sufficient axial shift of the coil to compensate for most cartridge irregularities or inaccurate engagement of the cartridge with a machine. For one quarter inch tape this dimension should not be greater than about 0.050 inch, however, to insure that the wraps of the coil will not slip from between each other during shipment and handling of the magazine.

As the tape is pulled through the slot, the innermost wrap of tape slides on the hub and adjacent wraps of tape in the coil rotate and slide relative to each other. Thus the tape should be of the type incorporating a lubricant such as Scotch Brand Tapes Numbers 157 or 156 as manufactured by Minnesota Mining and Manufacturing Co. of St. Paul, Minn. Also to further facilitate free rotation of the coil, the peripheral surface of the hub over which the innermost wrap slides is preferably defined by a plurality of axially spaced annular ribs which limit surface contact between the hub and the coil.

The machine for use with the cartridge preferably includes a tape drive mechanism on one side of the transducer, means for receiving the magazine with the transducer, guides and drive mechanism in the central opening of the hub and the slot in the hub on the side of the transducer opposite the drive capstan, and means for causing relative movement between the portion of the tape extending across the central opening of the hub and the guides and transducer between an open position at which that portion of the tape can be positioned or removed from adjacent the guides and transducer to allow magazines to be changed, and a closed position with the guides engaging and guiding the strip along the transducer.

BRIEF DESCRIPTION OF THE DRAWING

The invention will be further described with reference to the accompanying drawing wherein like numbers refer to like parts in the several views, and wherein:

FIG. 1 is a horizontal plan view of a tape magazine according to the present invention;

FIG. 2 is a sectional view taken approximately along line 2—2 of FIG. 1;

FIG. 3 is an enlarged sectional view taken approximately along lines 3—3 of FIG. 1;

FIG. 4 is a view similar to that of FIG. 3, but which illustrates an alternate shape for ribs in the magazine;

FIG. 5 is a fragmentary plan view of a magnetic recording and/or playback machine designed to receive the tape magazine of FIG. 1;

FIG. 6 is a reduced fragmentary plan view of the tape magazine of FIG. 1 positioned on the machine of FIG. 5 with the mechanism of the machine in an open position; and FIG. 7 is a view similar to that of FIG. 6, but in which the mechanism of the machine is in a closed position.

DESCRIPTION OF THE PREFERRED EMBODIMENT

Referring now to FIGS. 1 through 3 of the drawing there is shown a tape magazine according to the present invention generally designated by the numeral 10. The magazine 10 includes a housing 12 comprising an annular hub portion or hub 14 having a central opening 16 and a slot 17 communicating between a peripheral surface 15 of the hub 14 and the central opening 16, and first and second opposed rectangular flange portions or flanges 18 and 19 extending radially outwardly from the hub 14.

An endless loop of strip material or lubricated magnetizable tape 20 has a major portion wound in a coil 22 about the hub 14 between the flanges 18 and 19 and a minor portion extending from the innermost wrap of the coil 22 through the slot 17, partially across the central opening 16, through a slot 24 in a portion of the flange 18 projecting over the central opening 16, around a side surface of the coil 22, and through a slot 25 in the flange 18 to the outermost wrap of the coil 22.

A curved wall 26 which helps define the slot 17 and an arcuate wall helping to define the slot 24 are positioned to guide the tape 20 therebetween partially across the diameter of the hub 14 with its edges generally in the plane of the innermost wrap of the coil 22.

The peripheral surface 15 of the hub 14 about which the coil 22 is positioned is defined by a plurality of axially spaced annular ribs 27 (FIG. 3) to reduce contact between the coil 22 and hub 14, and thereby promote free rotation of the coil 22 as tension is applied to pull the tape 20 through the slot 17 from the innermost wrap of the coil 22. Preferably the ribs 27 are generally rectangular in cross section as is illustrated in FIG. 3. Alternatively, however, the ribs could have a generally triangular cross section with radiused outer edges as are the ribs 28 illustrated in FIG. 4 wherein parts corresponding to parts of FIG. 3 are similarly numbered except for the addition of the suffix "a".

Also the inner surfaces of the flanges 18 and 19 are spaced apart a distance exceeding the width of the tape 20 by about 0.030 inch which not only allows free rotation of the coil 22 about the hub 14, but also allows the coil 20 to shift axially of the hub 14 to align (insofar as possible) with guides in the central opening 16 through which the tape 20 is pulled.

The housing 12 also includes a web 29 extending across one side of the central opening 16, which web 29 has orifices 30 through which portions of a tape drive, guides transducers and head shields on a tape recording/playback machine (such as that illustrated in FIGS. 4 through 6) may project into the central opening 16 to engage the tape 20 between the slots 17 and 24. Also the web 29 may, as illustrated support guide members 34 projecting normally into the central opening 16, which guide members 34 restrict the portion of the tape between the slots 17 and 24 to a path where it will not interfere with portions of a machine entering the central opening 16 through the orifices 30.

Preferably the housing 12 also includes an open sided rectangular protective cover 37 of transparent polymeric material having a peripheral flange 38 adapted to fit closely over and engage the outer edges of the flanges 18 and 19, and a rectangular wall 39 spaced from the flange 18 to allow tape 20 to move therebetween from the slot 24 to the slot 25 around the side surface of the coil 22 (FIG. 2). Also preferably the flange 18 is of a transparent polymeric material so that the condition of all the tape 20 in the magazine 10 can be observed through the cover 37 and flange 18.

Referring now to FIGS. 5 through 7 there is illustrated a novel machine 50 similar to the Model 1500 tape recording and/or playback machine available from Minnesota Mining and Manufacturing Company, but which has been adapted to receive the magazine 10 according to the present invention.

The machine 50 includes two transducers 51 each having an arcuate surface 52 through which signals may be read or recorded on the tape 20 by means of known magnetic recording and playback circuitry from the Model 1500 machine which is not described herein. Also included is a drive capstan 53 rotatably mounted on a frame 54 for the machine 50 on one side of the transducers 51. As in the Model 1500 machine, the capstan 53 is fixed to a flywheel 55 and driven by means including a drive motor 56 and a frictionally engaged drive train 57. The frame 54 includes a faceplate 59 (FIGS. 6 and 7) having a rectangular opening 58 and a horizontal support plate 60 recessed from the faceplate 59. The opening 58 and support plate 60 provide means or a station 61 adapted for receiving the magazine 10 in a predetermined position with the flange 19 against the support plate 60, and the transducers 51, the drive capstan 53, two head shields 69 and certain other portions of the machine projecting through the orifices 30 in the web 29. The orifices 30 key the location of the magazine 10 in the station 61 with respect to the machine 50 to locate the slot 17 in the hub 14 generally on the side of the transducers 51 opposite the drive capstan 53.

The machine 50 also includes means for releasably engaging and precisely guiding past the transducers 51 the portion of the tape 20 extending across the central opening 16 of the magazine 10 when the magazine is positioned in the station 61, and means for pressing that portion of the tape 20 into driving engagement with the capstan 53 so that rotation of the capstan 53 will pull the tape 20 from the coil 22 and across the first surfaces 52 of the transducers 51.

The means for releasably engaging and guiding the tape 20 past the transducers 51 includes two guides 62 flanking and fixed to the same support member as the transducers 51, and having reduced sections along their axis providing slots in which the tape 20 may be edge guided to precisely locate it axially of the guides 62 and thereby axially of the arcuate surfaces 52 of the transducers 51; and means for causing relative movement between the guides 62 and transducers 51 and the portion of the tape 20 across the central opening 16 when the magazine 10 is in the station 61 between an open position (FIG. 6) at which that portion of the tape can be positioned or removed from adjacent the guides 62 and transducers 51, and a closed position (FIG. 7) with the guides 62 engaging and guiding that portion of the tape along and in contact with the surfaces 52 of the transducers 51.

The guides 62 and transducers 51 are fixed to a support member 66 which is slidably mounted between opposed tracks 67 fixed to the frame 54. A cylindrical pin 63 is fixed to a plate 64 pivotably mounted on the frame 54 at a pivot pin 65. A mechanism to be described later can be operated to cause movement of the plate 64 and support member 66 in opposite directions and thereby movement of the guides 62 and transducers 51 and the pin 63 from the open position at which the guides 62 and transducers 51 and the pin 63 are spaced from opposite sides of the portion of the tape 20 extending across the central opening 16 in the magazine 10 when it is positioned at the station 61 (FIG. 6) to allow the magazine 10 to be positioned in or removed from the station 61; and the closed position at which the alignment between the guides 62 and transducers 51, the pin 63, the slot 17 and the drive capstan 53 cause tape 20 pulled from the magazine 10 (when it is in the station 61) to travel in a serpentine pattern through the guide slots on the guides 62 and across and in full width contact with both arcuate surfaces 52 of the transducers 51 (FIG. 7).

The means for pressing the tape 20 into driving engagement with the capstan 53 includes a soft resilient rubber roller 68 rotatably mounted on the plate 64. The roller 68, via pivotal movement of the plate 64 is moved relative to the drive capstan 53 between a disengaged position at which the drive capstan 53 and roller 68 are spaced apart (FIG. 6) so that the portion of the tape 20 across the central opening 16 of the magazine 10 can move therebetween as the magazine 10 is positioned in or removed from the station 61; and an engaged position (FIG. 7) at which, when the magazine 10 is in the station 61, that portion of the tape 20 is pressed into driving engagement with the capstan 53.

The mechanism for moving the guides 62, transducers 51 and the pin 63 between their open and closed positions simultaneously moves the rubber roller 68 between its disengaged and engaged positions. That mechanism includes a play lever 70 mounted on the frame 54 for pivotal motion about a rod 71 and adapted to be manually depressed. Fixed to the play lever 70 is a cam 72 which bears against a roller 73 on a slide member or slide 74. The cam 72 is shaped so that when the play lever 70 is depressed, the slide member 74 will be slid along guides 75 against the bias of a spring 76 away from the play lever 70 until the end of the cam is reached at which the roller 73 enters a detent in the cam 72 to retain the play lever 70 in its depressed position. Such movement of the slide 74 allows a post 77 on the plate 64 which projects through an opening 78 in the slide 74 to move with the slide 74, thereby allowing the plate 64 to move under the influence of a spring 79 to simultaneously move the pin 63 from its open to its closed position and move the rubber roller 68 to its engaged position. Upon such movement an edge 80 of the plate 64 engages a cam surface 81 on an arm 82 pivotably mounted on the frame 54 at a pin 83, thereby causing the arm 82 to pivot and slide a lug 84 fixed to the arm 82 along a channel 85 fixed to the support member 66 to slide the support member 66 carrying the guides 62 and transducers 51 toward the pin 63 to their closed position against the bias of a spring 86.

The machine 50 also includes stop and record levers 90 and 91 respectively which are pivotably mounted on the rod 71. The record lever 91 may be depressed with the play lever 70 to activate record circuitry in the machine 50 which is like that of the Model 1500. The stop lever 90 also operates a mechanism like that on the Model 1500 (not shown) to lift the play lever 70, thereby causing the roller 73 to disengage from the detent in the cam 72, which allows the play lever 70 and the slide member 74 to return to their original positions under the influence of the spring 76, thereby moving the plate 64 to its original position with the pin 63 and the rubber roller 68 in their open and disengaged positions respectively, and allowing the support member 66 to move under the influence of the spring 86 to return the guides 62 and transducers 51 to their open position.

While the machine 50 is one suitable embodiment of a machine that can be used with the magazine illustrated in FIGS. 1 through 3, other embodiments could be made without departing from the spirit of the present invention. For example, the number of transducers may be changed to suit the function of the machine. The support member to which the guides are fixed could be fixed to or be part of the frame and the magazine could be moved between different positions at the station to move the tape and the guides and transducers between their open and closed positions. Alternatively both the support member and the magazine at the station may be fixed, and a plurality of members like the pin 63 may be movable from an open position spaced from the transducers and guide to allow tape across the central opening 16 of the magazine 10 to be placed therebetween, and a closed position pressing that tape into engagement with the guides and transducers. Also, the magazine and machine structure claimed herein should be suitable for use with recording and playback machines utilizing other than magnetic encoding wherein the transducers record and/or read signals on strip material which were placed there by means such as punching, engraving, or photographic means. Thus the scope of the invention should not be limited to the mechanical embodiment illustrated herein, but only by the language of the dependent claims.

EXAMPLE

A magazine 10 as described herein was constructed of the rigid polymeric material acrylonitrile-butadiene-styrene with its peripheral surface having a diameter of $3\frac{1}{4}$ inches and a width of about 0.28 inch and being defined by four equallly spaced rectangular ribs each about 0.040 inch wide. The tape 20 used was Scotch Brand No. 157 magnetic recording tape, about $\frac{1}{4}$ inch wide and about 375 feet long, which tape was spliced at its ends to form the loop. The cartridge was mounted on a machine of the type described herein and the tape therein was driven at 7½ inches per second past a transducer. The force required to pull the tape from the innermost wrap of the coil at that speed was in the range of 2½ to 3 ounces. The phase error in signals produced was less than about 10 degrees, and the wow and flutter was about 0.05%. The tape could be advanced at over 60 inches per second without any noticeable binding of the tape in the coil, and when such fast advancement of the tape was terminated, the tape would stop almost instantaneously without the degree of overshoot normally experienced with known types of cartridges in which the coil is wound on a rotatable hub. The tape in the cartridge was also driven at speeds of up to about 120 inches per second. At speeds of over about 100 inches per second the portion of the tape between the drive capstan and the outermost wrap in the coil started to cyclically increase and decrease in length, evidencing an undesirable cyclic expansion and contraction of the coil and change in tension in the driven tape.

I claim:

1. In combination:
   a magazine comprising:
   a housing comprising a cylindrical hub having a central opening and a slot extending axially across the full width of the hub and communicating with said central opening, and first and second spaced opposed flanges extending radially outwardly from said hub; and
   an endless length of strip material having a major portion wrapped about said hub between said flanges and a minor portion extending from the innermost wrap of the coil through said slot, partially across said central opening and around the side surface of the coil to the outermost wrap of the coil;
   said flanges being spaced by a dimension exceeding the width of said strip material in the range of about 0.025 inch to about 0.05 inch to provide a space between the coil and the flanges, which space allows shifting of said coil axially along said hub;
   a recording and/or playback machine comprising:
   means defining a station for releasably receiving said magazine;
   drive means having members within said central opening of the magazine received in said station and in driving engagement with said minor portion of said strip material for pulling said strip material through said slot from said innermost wrap with the edges of said strip material between said drive mechanism and said hub generally coplanar with the edges of said coil;
   a transducer positioned within said central opening of the magazine received in said station and said strip material between said drive mechanism and the slot in said hub; and
   means within said central opening of the magazine received in said station for guiding said strip material in a precise predetermined path along said transducer;
   said means for defining a station being adapted to position said magazine so that the spacing between said flanges will afford axial shifting of said coil to align the edges of said coil with the edges of the strip material along said means for guiding to compensate for misalignment of said magazine with said means for receiving and dimensional irregularities in said magazine.

2. A method for moving an endless loop of strip material in a magazine in precise alignment past a transducer in a recording and/or playback machine releasably receiving the magazine despite irregularities in the magazine or slight misalignment between the machine and the magazine, said method comprising the steps of:
   providing in the magazine a hub having a central opening in which the transducer is positioned and having a slot extending axially across the full width of the hub and communicating with the central opening about which hub a major portion of the strip material is wrapped to form a coil with a minor portion of the strip material extending from the innermost wrap of the coil through the slot, across the central opening and then around the side surface of the coil to the outermost wrap of the coil;
   pulling the strip material from the innermost wrap of the coil across the transducer with the edges of the strip material across the transducer generally coplanar with the edges of the coil;
   guiding the strip material in a precise predetermined path across the transducer via guide means mounted on the machine; and
   allowing the coil of strip material to shift axially of the hub to align the edges of the strip material in the coil with the edges of the strip material along the guide means.

* * * * *